Figure 1:
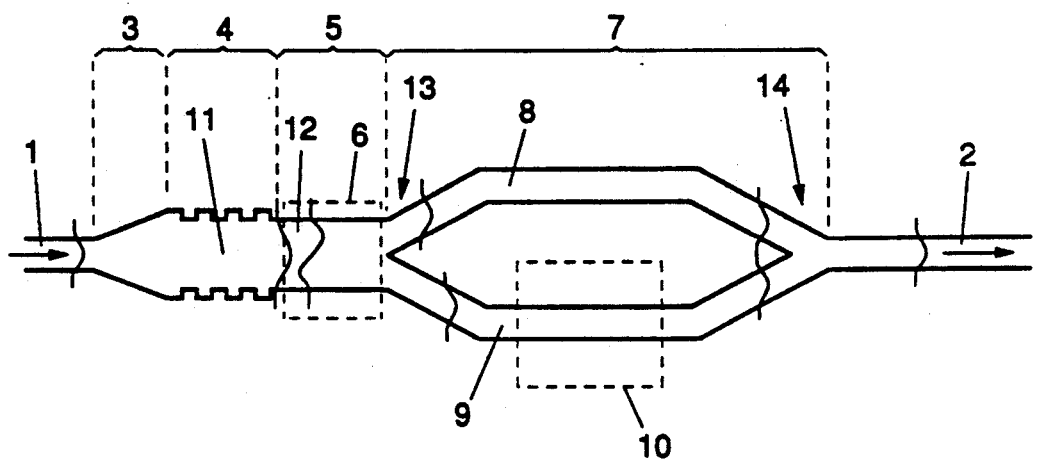

United States Patent [19]
Van der Tol

[11] Patent Number: 5,285,507
[45] Date of Patent: Feb. 8, 1994

[54] CONTROLLABLE POLARISATION TRANSFORMER

[75] Inventor: Johannes J. G. M. Van der Tol, Zoetermeer, Netherlands

[73] Assignee: Koninklijke PTT Nederland N.V., Groningen, Netherlands

[21] Appl. No.: 32,614

[22] Filed: Mar. 17, 1993

[30] Foreign Application Priority Data

Mar. 27, 1992 [NL] Netherlands ............ 9200576

[51] Int. Cl.$^5$ ............................................. G02B 6/10
[52] U.S. Cl. ....................................... 385/11; 385/28; 385/45; 385/31
[58] Field of Search ............... 385/11, 9, 23, 28, 31, 385/39, 45, 50, 132

[56] References Cited

U.S. PATENT DOCUMENTS 5,115,517 5/1992 Riviere ..................... 385/14 X
5,185,828 2/1993 van der Tol ............... 385/11 X

FOREIGN PATENT DOCUMENTS 58-91426 5/1983 Japan.
1-222216 12/1989 Japan.
2090992A 7/1982 United Kingdom.

OTHER PUBLICATIONS

M. Schlak, et al, "Tunable TE/TM-Mode Converter on (001)-In-P-Substrate", Jan. 1991, pp. 15-16, IEEE Photonics Technology Letters, No. 1, New York, US.

Y. Shani, et al, "Polarization Rotation in Asymmetric Periodic Loaded Rib Waveguides", Sep. 1991, pp. 1278-1280, 1991 American Institute of Physics.

Primary Examiner—John D. Lee
Assistant Examiner—Phan Thi Heartney
Attorney, Agent, or Firm—Frishauf, Holtz, Goodman & Woodward

[57] ABSTRACT

Controllable polarization transformer comprising a passive mode converter (4), a controllable phase shifter (5) and a controllable Mach-Zehnder interferometer (7). The mode converter (4) converts the first signal component of one polarization (TE or TM) of a light signal entering via an input (1) into a signal component of the other polarization without affecting the second signal component of the other polarization (TM or TE), the conversion taking place to another order of the guided mode. Phase control by means of the phase shifter (5) controls the intensity distribution of the light signal over the two branches (8, 9) of the interferometer (7). Optical wavelength control in the interferometer (7) controls the phase with which the signals through the branches come together in the output (2). Advantages: very good integration capability, preferably on semiconductor material, with a waveguide structure which can be achieved in a single etching step and without critical manufacturing parameters; can be used reciprocally, even as a polarization modulator.

9 Claims, 1 Drawing Sheet

CONTROLLABLE POLARISATION TRANSFORMER

A. BACKGROUND OF THE INVENTION

1. Field of the Invention

The invention is in the field of optical transmission systems and, more particularly but not exclusively, of those systems in which coherent detection is used. The invention relates to an optical device for controllably transforming the polarization of an optical signal.

2. Prior Art

In a coherent optical receiver, a received signal and the signal originating from a local oscillator can be ideally combined only if the polarization states of the signal are identical. The received signal normally enters via a non-polarization-maintaining light path, with the result that the polarization state of said signal is undefined on reception. One of the solutions to this problem is achieved by polarization control, in which case the polarization state of one of the two signals is altered in such a way that it corresponds to that of the other signal. Such a solution in which the polarization state of the local oscillator signal is altered is disclosed in reference [1]. The polarization control disclosed therein is carried out using a controllable polarization transformer which is driven via a feedback loop. In addition to some controllable polarization transformers constructed using discrete components, this reference describes an integrated optical version which is based on lithium niobate and which is disclosed in more detail in reference [2]. This known transformer comprises a controllable polarization mode converter sandwiched between two separately controllable phase shifters. Both the phase shifters and the polarization mode converter are based on electrooptical modification of the propagation of the TE component and the TM component in a monomodal channel-type waveguide. The actual conversion of a fraction of one polarization component into the other polarization component (TE ⟷ TM) takes place in the polarization mode converter. In an integrated optical version of a coherent optical receiver, not only optical, but opto-electronic and electrical signal processing has to take place on one chip. Since it is at present usual to chose a wavelength in the near infrared for the light signal, with the present prior art an integrated optical receiver provided with such a polarization transformer can only be produced using of semiconductor material such as indium phosphide (InP). A polarization mode converter which is based on InP and which makes use of the linear electrooptical effect in said material is disclosed in reference [3]. To produce a controllable polarization transformer based on the principle disclosed in reference [2], at least one phase shifter must be added thereto. The total length of the converter and the phase shifter is, however, fairly large, approximately 10 mm, compared with the available space on InP substrates which are usual at the present time. There is therefore a need to base a controllable polarization transformer on a modified principle which permits a shorter length for such a component when integrated on the basis of semiconductor materials such as InP.

B. SUMMARY OF THE INVENTION

The object of the invention is to provide a controllable polarization converter which satisfies the above-mentioned need.

For this purpose, an optical device for controllably converting a light signal entering via a wave-guiding input channel and comprising, in an unknown ratio, a first signal component propagating in a first guided mode with a polarization TX (TE or TM) and a second signal component propagating in a second guided mode with a polarization TY (TM or TE) into a light signal issuing via a wave-guiding output channel and propagating with a predetermined polarization TY, which device comprises polarization conversion means for concerting the first signal component to a third signal component having the polarization TY, and phase control means for controlling the phase between the second and the third signal component, has, according to the invention, the characteristic that the polarization conversion means comprise a TX→TY mode converter for converting the first signal component propagating in the first guided mode with the the third signal component propagating in a third guided mode with the polarization TY and in order different from the order of the first guided mode, that the phase control means comprise a controllable phase shifter provided with first control means for regulating the relative phase between the second signal component in the second guided mode and the third signal component in the third guided mode, and that, moreover, combination means are provided for combining the second and the third signal components to form the output signal.

The invention makes use of the fact that reference [3] discloses a passive mode converter with which the first signal component having one polarization in an entering light signal can be converted into a signal component having the other polarization without appreciably modifying the second signal component having said other polarization in said light signal, provided the conversion takes place to another order of the guided mode. With complete conversion, the light signal at the output of such a mode converter contains only signal components of the same polarization, albeit in guided modes of different order. The principle of the invention is generally applicable; in preferred embodiments the conversion will be between guided modes of the $0^{th}$-and the $1^{th}$-order. Then the guided modes can easily be combined with the aid of a Mach-Zehnder interferometer if the total light signal is distributed with equal intensity over the branches of the interferometer and the light contributions from both branches then come together in phase at the output thereof. This can be achieved, respectively, with the controllable phase shifter incorporated between the mode converter and the interferometer and the optical path-length control in one of the branches of the interferometer. Preferably, the device therefore is, according to the invention, characterized in that the wave-guiding input and output channels are monomodal, in that the device is provided, moreover, with a wave-guiding adapter for the gradual transition from the monomodal input channel to a bimodal waveguide, in that the mode converter is constructed as a passive mode converter provided with a first bimodal waveguide which adjoins the adapter, in that the phase shifter comprises a second central bimodal waveguide which adjoins the first bimodal waveguide, and in that the combination means are formed by a controllable Mach-Zehnder interferometer provided with two monomodal wave-guiding branches and second control means with which the difference in optical path length between the branches is controllable in one of the branches, the branches of the interferometer being coupled, on the one hand, to the second bimodal waveguide of the phase shifter by means of a first symmetrical Y junction and, on the other hand, to said output channel by means of a second symmetrical Y junction.

All the subcomponents of such a controllable polarization transformer can readily be integrated using materials which are standard in integrated optics. A marked, controllable modification of propagation, such as is needed in the phase shifter and the interferometer, accompanied by a short component length can readily be achieved with the present prior art using semiconductor materials, such as InP, by means of charge carrier injection. In a preferred embodiment, the controllable polarization transformer is therefore characterized in this sense.

The device according to the invention can also be used reciprocally. In that case, the invention provides an optical device for controllably transforming a light signal entering via a wave-guiding input channel and propagating with a polarization TX (TE or TM) into a light signal issuing via a wave-guiding output channel and having any desired polarization, which component comprises polarization conversion means for converting a first signal part of the input signal into a first signal component propagating with the polarization TY (TM or TE), and phase control means for controlling the phase between the first signal component and a second signal component formed by the second, residual signal part of the input signal, the issuing light signal being formed by the first and the second signal component, characterized in that, moreover, controllable conversion means are provided for controllably converting the first signal part of the input signal into an intermediate signal component propagating in a guided mode with the same polarization but of different order from the input signal, in that the phase control means comprise a controllable phase shifter provided with first control means for controlling the relative phase between the intermediate signal component and the second signal component, and in that the polarization conversion means comprise a mode converter for converting the intermediate signal component into the first signal component.

As a result of not using the phase control means in the reciprocal application or of not incorporating it in the device, an optical device is obtained which is very suitable for polarization modulation or switching.

The device according to the invention provides a controllable polarization transformer which can readily be integrated using known procedures, it being possible to achieve the waveguide structure in a single etching step, there being no critical parameters in the manufacture and the control currents required for control being relatively low in the case of integration on semiconductor material such as InP.

C. REFERENCES

[1] N. G. Walker and G. R. Walker, "Polarization control for coherent optical fibre systems", Br. Telecom Technol. J., Vol 5, No. 2, April 1987, pp. 63-76;
[2] GB-A-2090992 entitled: "Polarization transformer";
[3] EP-A-0513919 (by the applicant; not published on time) entitled: Mode converter.

D. SHORT DESCRIPTION OF THE DRAWING

Figure 2:
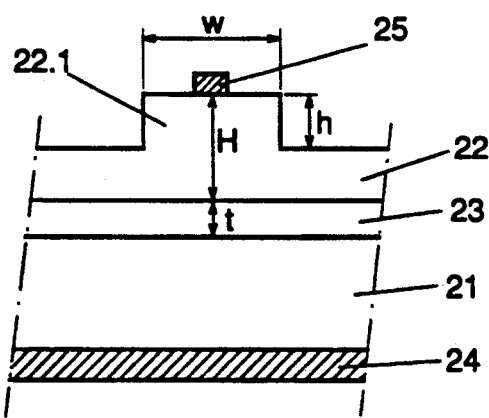

The invention will be explained in greater detail by means of the description of an exemplary embodiment with reference to a drawing, wherein:

FIG. 1 shows diagrammatically an optical component according to the invention in a plan view; and FIG. 2 shows a cross section of a waveguide structure which can be used in the component shown in FIG. 1.

E. DESCRIPTION OF AN EXEMPLARY EMBODIMENT

Polarization control can be used in two ways in coherent optical receivers. As a first possibility, the polarization state of a received signal having an unknown polarization can be adjusted by polarization control to the polarization state of the signal originating from the local oscillator. As a second possibility, the polarization state of the local oscillator signal can be tuned to that of the received signal having the unknown polarization. FIG. 1 shows diagrammatically a plan view of the structure of a controllable polarization transformer according to the invention, which polarization transformer can be used to each of the two methods of polarization control. The first possibility can be implemented with a signal direction from left to right. The second possibility, if the transformer is used reciprocally, with a signal direction from right to left. As is shown diagrammatically in FIG. 1, the polarization transformer comprises, between a monomodal channel-type incoming waveguide 1 and a similar outgoing waveguide 2, the following wave-guiding sections consecutively and adjoining one another:

a wave-guiding adapter 3 from a monomodal to a bimodal waveguide;

a mode converter 4 which converts only the $TX_{00}$ component of a signal having the signal components in the $TX_{00}$ guided mode and the $TY_{00}$ guided mode into a signal component which propagates further in a $TY_{01}$ guided mode while the $TY_{00}$ component remains unaffected; both TX and TY stand here for one of the polarizations TE or TM, TX not being identical to TY;

a controllable phase shifter 5 in which the phase can be controlled between signal components propagating in the guided modes $TY_{00}$ and $TY_{01}$ by means of phase control means 6 (broken-line rectangle);

a Mach-Zehnder interferometer 7 having wave-guiding branches 8 and 9, the optical wavelength in the branch being controllable in the branch 9 by means of the control means 10 (broken-line rectangle).

For the mode converter 4, a passive 100% converter is preferably chosen which is of a type such as is disclosed in reference [3]. To implement the invention, two mode converters can be used, viz. the $TE_{00} \rightarrow TM_{01}$ mode converter and the $TM_{00} \rightarrow TE_{01}$ mode converter. For the sake of convenience, the controllable polarization transformer provided with a $TM_{00} \rightarrow TE_{01}$ mode converter will be described in the further description of the exemplary embodiment. Said mode converter has a central bimodal waveguide 11 having a periodically varying geometrical structure in its longitudinal direction, this being indicated in the figure by a number of alternating repetitive constrictions and widenings of the waveguide 11 over the length.

The phase shifter 5 may be constructed as a bimodal waveguide 12, which may simply be the continuation of the central bimodal waveguide 11 of the mode converter, assuming that the refractive index can be altered therein with a sufficiently marked effect using suitable control means, so that the mutual phase between the signal components, emerging from the mode converter, of different guided modes having the same polarization can be adjusted therewith.

The interferometer 7 adjoins the bimodal waveguide 12 by means of a symmetrical Y junction 13 which splits the bimodal waveguide 12 into two monomodal waveguides forming the decoupled branches 8 and 9. These monomodal wave-guiding branches 8 and 9 are brought together again by means of a symmetrical Y junction 14 and converted into the monomodal outgoing guide 2.

The operation is as follows:

Given a signal direction from left to right, a signal having unknown polarization is converted into a signal in the TE polarization state. A signal entering via the monomodal channel-type waveguide 1 and having an unknown polarization generally contains a $TE_{00}$ component and a $TM_{00}$ component of arbitrary relative strength and having arbitrary relative phase. Said signal propagates via the adapter 3 into the bimodal waveguide 12 of the mode converter 4. In the mode converter 4, the $TM_{00}$ component is converted into a $TE_{01}$ component, while the $TE_{00}$ component remains virtually unaltered. The $TE_{01}$ component obtained, however, still has an unknown intensity and phase compared with the $TE_{00}$ component. If the mutual phase difference between the $TE_{00}$ component and the $TE_{01}$ component is adjusted to $+\pi/2$ or $-\pi/2$ in the phase shifter 5 with the aid of the control means 6, beyond the phase shifter the signal will distribute itself via the symmetrical Y junction 13 into signal parts having equal power over the two branches 8 and 9 of the interferometer 7. If the optical wavelength difference between the branches 8 and 9 is adjusted in the branch 9 with the aid of the control means 10 in such a way that the two signal parts arrive in phase at the Y junction 14, the two signal parts will combine to form a maximum signal which propagates further in the $TE_{00}$ guided mode in the outgoing waveguide 2. For use as a polarization controller, the control means 6 and 10 of the controllable polarization transformer are adjusted to a maximum signal in the outgoing waveguide.

In the case of a reciprocal use of the transformer, this being with a signal direction from right to left, a signal having known polarization, in this case the TE polarization, can be transformed into a signal in any desired polarization state by adjusting the control means 6 and 10. A signal in the TE polarization entering via the waveguide 2 is split in the Y junction 14 into signal parts of identical intensity and guided mode, which propagate further along the branches 8 and 9 of the interferometer 7. Depending on the relative phase difference with which said signal parts are again combined in the Y junction 13, the combined signal propagates in the bimodal waveguide 12 of the phase shifter 5, either exclusively in the $TE_{00}$ mode (for a relative phase difference of $2k\pi$ rad, where $k=0,\pm1,\pm2$, etc.) or exclusively in the $TE_{01}$ mode (for a relative phase difference of $(2k+1)\pi$ rad, where $k=0,\pm1,\pm2$, etc.) or in a mixed signal having signal components in the $TE_{00}$ mode and the $TE_{01}$ mode, and with an amplitude ratio which is directly dependent on the relative phase difference. Said phase difference can be adjusted by controlling the optical wavelength difference between the branches 8 and 9 with the aid of the control means 10. In the mode converter 4, the signal component in the $TE_{01}$ mode is converted into a signal component in the $TM_{00}$ mode, while the other signal component in the $TE_{00}$ mode of the mixed signal passes through the mode converter unchanged. Both signal components propagate further in unchanged form via the first adapter 3 and the monomodal waveguide 1. The relative phase difference which exists between the two signal components on passing through the adapter 3 can be adjusted with the aid of the control means 6 of the phase shifter 5. A signal which enters with a TE polarization via the waveguide 2 can therefore be transformed by an amplitude control with the aid of the control means 10 and a phase control with the aid of the control means 6 into a signal which has any desired polarization state and issues via the waveguide 1. If the phase control with the aid of the control means 6 is omitted or if the control means 6 are absent, the polarization transformer is very suitable in the reciprocal direction for polarization modulation such as is used, for example, in 'data induced polarization switching' (DIPS) procedures. By controlling the amplitude with the aid of the control means 10 in the interferometer, electrical signals corresponding to binary "0" and "1" can be interpreted as corresponding $TE_{00}$ and $TE_{01}$ signals. In the mode converter 4, a TE mode and a TM mode are then produced as a representation of these binary values.

All the wave-guiding sections of the polarization transformer as shown diagrammatically in FIG. 1 can in principle be produced entirely with known integration techniques and using standard waveguide materials and structures in the process. However, the restriction applies that the waveguide materials with which at least the phase shifter 5 and branch 9 of the interferometer 7 are produced must always have the possibility of the above mentioned phase and optical path length controls. Theoretically, the desired controls can be achieved by modifying the light propagation in the respective waveguides by means of electro-optical, thermo-optical, opto-optical, etc., effects with suitable choice of the material of the waveguide or of its surroundings and the matching modifying means. Preferably, however, use is made of electrooptical effects and, more particularly, of charge carrier injection into the semiconductor material. If a material such as InP is used, the entire waveguide structure of the polarization transformer in FIG. 1 can be produced with the same type of ridge-type waveguide, whose cross section is shown in FIG. 2. Situated between a substrate 21 and an upper layer 22, both composed of InP, is a light-guiding layer 23 composed of InGaAsP and having thickness t. Over the entire length of the waveguide structure, the upper layer 22 has in places a ridge-type platform 22.1 having a fixed height h with a total height H, and having a width w which varies for the various successive waveguides 1,3,11,12,8,9 and 2. For the purpose of charge carrier injection into the bimodal waveguide 12 and the monomodal waveguide 9, a planar electrode 24 extends over the underside of the substrate 11, at least under a part of each of the waveguides 9 and 12, for example as indicated by the broken-line rectangles indicating the control means 10 and 6 in FIG. 1. Situated above the planar electrode 24 on the ridge-type platform of each of the waveguides 9 and 12 is a strip-type electrode 25. A controllable current source can be connected to the electrodes 24 and 25 in the case of each of the waveguides 9 and 12 via supply and drain leads (not shown) in order to supply a current with which, as is known, charge carrier injection into the upper layer 22 can be achieved at the position of the ridge-type platform 22.1, as a consequence of which an alteration of the refractive index is brought about. Thus, each of the control means 6 and 10 comprises an electrode pair 24 and 25. The electrode 25, which forms part of the control means 10, is not critical and can be chosen as narrow compared with the width w as shown, but preferably has the same width as the ridge-type platform 22.1. The electrode 25, which forms part of the control means 6, is preferably constructed either as a single narrow strip situated in the center above the ridge-type platform 22.1 of the bimodal waveguide 12, or as two narrow, electrically coupled strips situated near the edges of the ridge-type platform 22.1. In both embodiments, an effective, controllable phase shift can be achieved by means of a charge carrier injection between the two modes propagating in the bimodal waveguide 12, viz. the $TE_{00}$ mode and the $TE_{01}$ mode. This is based on the fact that, as is known, the field strength distribution of the zeroth-order mode and that of the first-order mode exhibit a characteristic difference in such a waveguide. Specifically, in the center of such a channel-type guide, the field strength associated with the first-order propagation mode is zero but that of the zeroth-order propagation mode, on the other hand, is a maximum. This therefore provides the possibility of modifying essentially only the propagation constant of one of the two guide modes in the waveguide, that is to say of the zeroth-order (single strip) or the first-order mode (two strips), and consequently modifying the relative phase difference between said propagation modes.

The following values serve to illustrate a controllable polarization transformer having a structure as described on the bases of FIG. 1 and FIG. 2 and suitable for light signals having a wavelength of 1.5 $\mu$m: for the ridge-type waveguide structure refractive index of InP $n_1 = 3.1753$,
refractive index of InGaAsP $n_2 = 3.4116$,
$t = 0.473$ $\mu$m, $H = 0.504$ $\mu$m, $h = 0.2$ $\mu$m.

Said ridge-type waveguide structure can be produced in one etching step, the width w being the sole variable parameter:

the incoming waveguide 1 must be monomodal for TE and TM; therefore $w = 4.3$ $\mu$m maximum;

the adapter 3 must adapt from monomodal to bimodal, the bimodal channel preferably having a width which is such that said channel is bimodal only for the TE polarization; a width of $w = 8.5$ $\mu$m is suitable for this purpose, while approximately 1° is chosen as the adaptation angle for the transition; consequently, the length of the adapter is approximately 200 $\mu$m;

the mode converter 4 is a 100% $TM_{00} \rightarrow TE_{01}$ mode converter having $N = 11$ coupling surfaces and a coupling length of $L = 91$ $\mu$m; in the periodically varying structure of widenings and constrictions, each widening has a width of $w = 8.5$ $\mu$m and each constriction has a width of $w = 6$ $\mu$m; the total length of the mode converter is approximately 1000 $\mu$m;

the central bimodal waveguide 12 of the phase shifter 5 has a width $w = 8$ $\mu$m and a length of approximately 1 mm; the strip-type electrode 25, which forms part of the control means 6, is situated over the entire length of the ridge-type platform 22.1 of the bimodal waveguide 12 and has a width of 3 $\mu$m; the length of the strip-type electrode 25 is determined by the fact that, as a minimum, a phase difference of $\pi/2$ must be capable of being achieved between the $TE_{00}$ mode and the $TE_{01}$ mode;

the Y junction 13 has a splitting angle of approximately 1° and transforms the bimodal waveguide 12 into the monomodal wave-guiding branches 8 and 9 up to a mutual spacing of approximately 10 $\mu$m, with the result that said branches are decoupled; the length of the Y junction 13 is consequently approximately 500 $\mu$m;

the waveguides of the branches 8 and 9 have a width of 4.3 $\mu$m $< w < 6$ $\mu$m; the strip-type electrode 25, which forms part of the control means 10, is situated over a length of approximately 50 $\mu$m of the ridge-type platform 22.1 of the monomodal waveguide of the branch 9, in that part in which the branches 8 and 9 are decoupled, and has a width equal to the width of the ridge-type platform at this point; the length of approximately 50 $\mu$m of the strip-electrode 25, which forms part of the control means 10, is determined by the fact that, as a minimum, an optical path length difference corresponding to a phase difference of $\pi$ rad must be capable of being achieved between the branches 8 and 9;

the Y junction 14 also has a splitting angle of approximately 1° and transforms the monomodal waveguides of the branches 8 and 9 into the monomodal outgoing waveguide 2; the length of the Y junction 14 is consequently approximately 600 $\mu$m;

the outgoing waveguide 2 has to be monomodal in the present example only for the TE polarization; this is achieved with a width $w = 6$ $\mu$m as a maximum.

The other dimensions of the strip-type electrode 25 and the choice of material for the electrodes are in fact not relevant to the control action of the respective control means of which the electrode forms part; a thickness of approximately 200 nm is normally to be chosen with a layered structure of Ti (2-5 nm), Pt (2-5 nm) and Au.

The total length of such a controllable polarization transformer is therefore approximately 3.35 mm, which is appreciably shorter than that which can reasonably be expected of a known electro-optical controllable transformer. This shortening is achieved primarily as a result of a combination of effects which are much more marked than the linear electro-optical effect, viz. a polarization conversion by means of a passive mode conversion and an active phase adjustment by means of charge carrier injection.

I claim:

1. Optical device for controllably converting a light signal entering via a wave-guiding input channel and comprising, in an unknown ratio, a first signal component propagating in a first guide mode with a polarisation TX (TE or TM) and a second signal component propagating in a second guided mode with a polarisation TY (TM or TE) into a light signal issuing via a wave-guiding output channel and propagating with a predetermined polarisation TY, which device comprises:

polarisation conversion means for converting the first signal component into a third signal component having the polarisation TY, and phase control means for controlling the phase between the second and the third signal component, characterised in that the polarisation means comprise a TX→TY mode converter for converting the first signal component propagating in the first guided mode with the polarisation TX into the third signal component propagating in a third guided mode with a polarisation TY and in order different from the order of the first guided mode, in that the phase control means comprise a controllable phase shifter provided with first control means for regulating the relative phase between the second signal component in the second guided mode and the third signal component in the third guided mode, and in that, moreover, combination means are provided for combining the second and the third signal components to form the light signal issuing via the output channel.

2. Optical device according to claim 1, characterised in that the wave-guiding input and output channels are monomodal, in that the device is provided, moreover, with a wave-guiding adapter for the gradual transition from the monomodal input channel to a bimodal waveguide, in that the mode converter is constructed as a passive mode converter provided with a first bimodal waveguide which adjoins the adapter, in that the phase shifter comprises a second central bimodal waveguide which adjoins the first bimodal waveguide, and in that the combination means are formed by a controllable Mach-Zehnder interferometer provided with two monomodal wave-guiding branches and second control means with which the difference in optical path length between the branches is controllable in one of the branches, the branches of the interferometer being coupled, on the one hand, to the second bimodal waveguide of the phase shifter by means of a first symmetrical Y junction and, on the other hand, to said output channel by means of a second symmetrical Y junction.

3. Optical device according to claim 2, characterised in that the wave-guiding channels are constructed in semiconductor material, and in that the first and second control means are electrode means for achieving a charge carrier injection into the respective waveguides.

4. Optical device for controllably transforming a light signal entering via a wave-guiding input channel and propagating with a polarisation TX (TE or TM) into a light signal issuing via a wave-guiding output channel and having any desired polarisation, which device comprises:

polarisation conversion means for converting a first signal part of the input signal into a first signal component propagating with the polarisation TY (TM or TE), and phase control means for controlling the phase between the first signal component and a second signal component formed by the second, residual signal part of the input signal, the issuing light signal being formed by the first and the second signal component, characterised in that, moreover, controllable conversion means are provided for controllably converting the first signal part of the input signal into an intermediate signal component propagating in a guided mode with the same polarisation but of different order from the input signal, in that the phase control means comprise a controllable phase shifter provided with first control means for controlling the relative phase between the intermediate signal component and the second signal component, and in that the polarisation conversion means comprise a mode converter for converting the intermediate signal component into the first signal component.

5. Optical device according to claim 4, characterised in that the wave-guiding input and output channels are monomodal, in that the conversion means are formed by a controllable Mach-Zehnder interferometer provided with two monomodal wave-guiding branches and second control means for controlling the difference in optical path length between the branches in one of the branches, the branches of the interferometer being coupled, on the one hand, to said input channel by means of a first symmetrical Y junction and, on the other hand, to the phase shifter by means of a second symmetrical Y junction, in that the phase shifter comprises a first, central bimodal waveguide which adjoins the second symmetrical Y junction, in that the mode converter is constructed as a passive mode converter provided with a second bimodal waveguide which adjoins the first bimodal waveguide of the phase shifter, and in that the device is provided, moreover, with a wave-guiding adapter for the gradual transition from the second bimodal waveguide of the mode converter to the monomodal output channel.

6. Optical device according to claim 5, characterised in that the wave-guiding channels are constructed in semiconductor material, and in that the first and second control means are electrode means for achieving a charge carrier injection into the respective waveguides.

7. Optical device for controllably transforming a light signal entering via a wave-guiding input channel and propagating with a polarisation TX (TE or TM) into a light signal issuing via a wave-guiding output channel and comprising a controllable mix of the polarisations TE and TM, which device comprises:

polarisation conversion means for converting a first signal part of the input signal into a first signal component propagating with the polarisation TY (TM or TE), the issuing light signal being formed by the first signal component and a second signal component formed by the second, residual signal part of the input signal, characterised in that, moreover, controllable conversion means are provided for controllably converting the first signal part of the input signal into an intermediate signal component propagating in a guided mode with the same polarisation but of different order from the input signal, and in that the polarisation conversion means comprise a mode converter for converting the intermediate signal component into the first signal component.

8. Optical device according to claim 7, characterised in that the wave-guiding input and output channels are monomodal, in that the conversion means are formed by a controllable Mach-Zehnder interferometer provided with two monomodal wave-guiding branches and control means for controlling the difference in the optical path length between the branches in one of the branches, the branches of the interferometer being coupled, on the one hand, to said input channel by means of a first symmetrical Y junction and, on the other hand, to the mode converter by means of a second symmetrical Y junction, in that the mode converter is constructed as a passive mode converter provided with a second bimodal waveguide which adjoins the second symmetrical Y junction, and in that the device is provided, moreover, with a wave-guiding adapter for the gradual transition from the second bimodal waveguide of the mode converter to the monomodal output channel.

9. Optical device according to claim 8, characterised in that the wave-guiding channels are constructed in semiconductor material, and in that the control means are electrode means for achieving a charge carrier injection into the respective wave guides.

* * * * *